United States Patent [19]
Griffiths et al.

[11] Patent Number: 4,546,485
[45] Date of Patent: Oct. 8, 1985

[54] METHOD AND APPARATUS FOR PRODUCING UNIFORM STRANDS FROM A SPLIT FIBER GLASS BUSHING

[75] Inventors: David H. Griffiths; Larry G. Wright, both of Lexington, N.C.

[73] Assignee: PPG Industries, Inc., Pittsburgh, Pa.

[21] Appl. No.: 556,828

[22] Filed: Dec. 1, 1983

[51] Int. Cl.⁴ .............................................. C03B 5/02
[52] U.S. Cl. ......................................... 373/28; 65/1; 65/2; 219/494; 219/504
[58] Field of Search .................. 65/2, 29, 12, 160, 162, 65/164; 219/483, 494, 497, 504, 505; 373/28, 135, 136; 323/353, 354, 367

[56] References Cited
U.S. PATENT DOCUMENTS 3,218,138  11/1965  Mennerich .......................... 65/162
3,246,124  4/1966   Trethewey ........................... 65/162
3,308,270  3/1967   Jensen ..................................... 65/2
4,024,336  5/1977   Jensen ..................................... 65/1
4,285,712  8/1981   Thompson ............................... 65/2

Primary Examiner—J. R. Scott
Assistant Examiner—Gregory D. Thompson
Attorney, Agent, or Firm—John E. Curley

[57] ABSTRACT

A method of equalizing production on a split fiber glass forming bushing is described involving averaging the temperature measured across a bushing face plate, and controlling the power input to the bushing in response to that measured average. The two halves of the bushing are controlled by placing a variable resistor in the power supply lines to the bushing and adjusting current input to the sides in response to variations in weight or yardage measured for the two strands produced by the split bushing.

7 Claims, 3 Drawing Figures preferably equidistant from each other, to measure temperatures generated at the plate surface. The temperatures sensed produce signals in the thermocouples which are carried by electrical lead lines which are associated with each of the thermocouples.

In thermocouple 31 the signals are carried by lead lines 40, 41, in thermocouple 32 by lines 42 and 43, in thermocouple 33 lines 44 and 45 and in thermocouple 34 by lines 46 and 47. Resistors are placed in each of the aforementioned lead lines. Thus, resistors 40' and 41' are in lines 40 and 41 respectively, 42' and 43' are in lines 42 and 43 respectively, resistors 44' and 45' are in lines 44 and 45 respectively and resistors 46' and 47' are in lines 46 and 47 respectively. The resistors 40', 41', 42', 43' 44', 45', 46', and 47' are sized such that the differences in the resistances of the platinum wires from the thermocouples to the outlet averaged signal carried in lines 20 and 21 are essentially masked. By providing resistors large enough to ignore the small differences in the potential drop across the various wires caused by length and thickness variations in wires 40, 41, 42, 43, 44, 45, 46, and 47 a true average can be obtained. More importantly, the resistors prevent the shunting of large amounts of current through the thermocouple wires themselves. The averaged signal produced by the four thermocouples is fed via lines 23 and 24 into the temperature controller 25. This controller produces a signal transmitted by lines 26 and 27 to the power pack 5 of FIG. 1. The power pack 5 then adjusts the power feed to the primary coil 7 of the transformer 8 which then adjusts current fed to the bushing 17.

FIG. 3 is another diagrammatic illustration of the thermocouple averaging device showing the bushing 17 as a resistor element. Since the bushing is constructed of platinum, it acts as a resistance heating element. Thus, current is fed to the bushing 17 and the resistance across the heating element or bushing 17 is the mechanism by which the metal is heated to maintain the glass contained in the bushing 17 in a molten state. The variable resistor 14 is utilized to shunt current in lines 11 and 12 to the bushing proper. By manipulation of the wiper arm 16 the current fed to each side of the bushing 17 is altered by the shunt, i.e. line 13, element 14 and arm 16. Thus, movement of the arm 16 to the left or to the right as a result of observation of unequal weights of forming packages being formed from the bushing 17 on a single winder, changes the current flow to each bushing half via the shunt and consequently the degree of heating of each bushing half.

In a practical embodiment of the instant invention, the power pack 5 used for controlling transformer 8 is typically an SCR circuit constructed and arranged to regulate the voltage input to the transformer primary. An SCR control power pack rated at forward current of 30 to 40 amps with an average of 35 amps is preferred and can be selected to have a forward blocking voltage from 800 to 1200 volts. The particular power pack controller utilized in conducting an experiment utilizing the instant invention was a Model 110 controller purchased from Control Systems Inc., Fairmont, W. Va. The resistors utilized in the averaging device were 10 ohm resistors having a variance of ±2%. In the preferred embodiment the impedance 14 employed was a 0.5 ohm resistor.

In order to prepare the system to render it operative for forming department operators so that adjustments could be made manually, an examination of a typical fiber glass split bushing was made. The amount of current change required to produce a given change in the front package weight and the back package weight of two packages being formed from a single split bushing on a single winder was determined. In general, for a complete understanding of the terminology and for purposes of this specification, the bushing as viewed by the operators is divided into a left half and a right half. The fibers drawn in the left half of the bushing are gathered in a gathering shoe and wound onto the front half of a collet which is positioned at a 90° angle to the longitudinal axis of the bushing. The fibers from the right half of the bushing are gathered into a strand and are wound on the winder on the back half.

A split bushing, in this instance a double G 75, was operated for three consecutive call downs to obtain base line data. Current changes were then made to determine the effect of a current change on front and back package weights. In the first test the wiper arm 16 was centered on the resistor 14 of FIG. 3 to produce zero current through arm 16. In a second test, arm 16 was moved in one direction until a 10 amp current appeared in arm 16. In a third test the arm 16 was moved in the opposite direction to the second test arm movement until a 10 amp current appeared. In the fourth test the second test was repeated. Currents were measured by a clamp on ammeter. In each of the tests forming package weights from front and back were made. This data was recorded and is shown in table I.

TABLE I

| Base Line Weights in Lbs. | Weights After 10 Amp Change In Lbs. | Weights After 10 Amp Change In Lbs. | Weights After 10 Amp Change In Lbs. |
|---|---|---|---|
| Front 22.10 | 22.48 | 21.73 | 22.38 |
| Back 22.15 | 21.98 | 22.43 | 21.97 |

The above table indicates that a 10 amp change in current produces a 0.541 lb. average change in the front to back weight of the packages wound on the winder from the split bushing. Recognizing from the data obtained in table I that a 10 amp change can have the effect demonstrated by the table, a double G 75 bushing was then operated to approximate the base line weights of 22.10 lb. and 22.15 lb. Based on the results of the base line data obtained in Table I, the current was set on the bushing to give equal weights on front and back packages.

In the first runs, eleven consecutive call downs were made which yielded an average front weight of 22.12 pounds and a back weight of 22.15 pounds. These runs are listed in Table II. A second set of experiments was run with a slightly different current setting but designed to give equal weights on the front and back packages and thirteen additional runs were made. The average package weights of these runs were 22.26 lbs and 22.23 lbs front to back. These runs are tabulated below in table III.

TABLE II

| Package Wt. in Lbs. | |
|---|---|
| Front | Back |
| 22.05 lbs | 22.05 lbs |
| 22.00 | 22.00 |
| 22.10 | 22.10 |
| 22.20 | 22.20 |
| 22.20 | 22.05 |
| 22.10 | 22.10 |
| 22.20 | 22.30 |
| 22.00 | 22.20 |
| 22.25 | 22.15 |

METHOD AND APPARATUS FOR PRODUCING UNIFORM STRANDS FROM A SPLIT FIBER GLASS BUSHING

BACKGROUND OF THE INVENTION

Glass fibers are produced by drawing multiple streams of molten glass at a given rate of speed through orifices or nozzles located in a heated container known in the fiber glass industry as a bushing. The bushings containing the molten glass are electrically heated and maintained at given temperatures to provide molten glass at the orifices or nozzles at a desired viscosity. The maintenance of uniform temperature across the bushing face i.e., the area of the bushing on which the orifices or nozzles are located is important in providing uniform fiber formation from each orifice or nozzle. The fibers drawn from the orifices or nozzles are gathered after they solidify into one or more strands and are collected on a collet into one or more forming packages.

In recent years bushings have increased in size so that in industry today bushings having 800 to 2,000 or more orifices or nozzles are commonplace. It is also common practice to produce more than one strand from these larger bushings by winding, for example, two strands on a single collet using a single bushing. Typically this is accomplished by using one side of a bushing to produce one strand and the other side to produce a similar second strand. Splitting the bushing in this manner to produce more than one strand requires precise control of the bushing temperature from side to side on the bushing so that the strands produced and collected on a collet have the same yardage, i.e., the same yards per pound of glass, or viewed in another way the same weight of glass strand per package collected on the collet for a given period of time.

To provide good control of bushing temperatures on each side of a split bushing where two strands, one from each side are produced, it is also desirable to provide a control method which can be easily adjusted by an operator without recourse to the use of detailed and expensive control systems and equipment. In practice today, variations in temperature in split bushings as evidenced by a substantial variation in forming package weights on a winder used to collect two packages from a split bushing are compensated for by operators adjusting air flows to the bushing, adjusting fin cooler placement under the bushing orifices and/or terminal clamp positioning on the bushing. This system, as will be appreciated by the artisan is at best a function of operator skill which falls short of being satisfactory since such changes are manual, time-consuming, and of necessity not precise.

In U.S. Pat. No. 4,024,336, a system is described which controls two sides of a bushing by using two full wave variable impedance devices to regulate current transmitted to the bushing by a power transformer. While the relative yardage of two strands produced from a split bushing using this device may be manipulated, it has not always been effective because as change on one side of the bushing occurs it is always accompanied by a change on the other side. Further the system described requires the use of a temperature controller on each side of the bushing as well as two full wave variable impedance devices; which are costly on a per bushing basis considering that a modern fiber glass furnace forehearth can have 70 to 100 bushings positioned on it.

A need therefore exists for a simple system, easily adjustable by an operator, to control the two halves of a split fiber glass bushing producing two or more strands. The instant invention supplies that need.

SUMMARY OF THE INVENTION

In accordance with this invention, a simple electrical system is provided to regulate the temperature to each half of a split fiber glass bushing and maintain each side of the bushing substantially constant in temperature. The invention involves measuring the temperature of the bushing across its length at one or more distinct points, controlling the power supply to the bushing using measured temperatures, providing a shunt having an impedance therein in parallel with the bushing power supply and varying the current input to the bushing on each side by varying the impedance in each side of the shunt. Preferably the shunt impedance employed is a variable resistor.

BRIEF DESCRIPTION OF THE DRAWINGS

In the accompanying drawings.

DETAILED DESCRIPTION OF THE DRAWINGS

Figure 1:
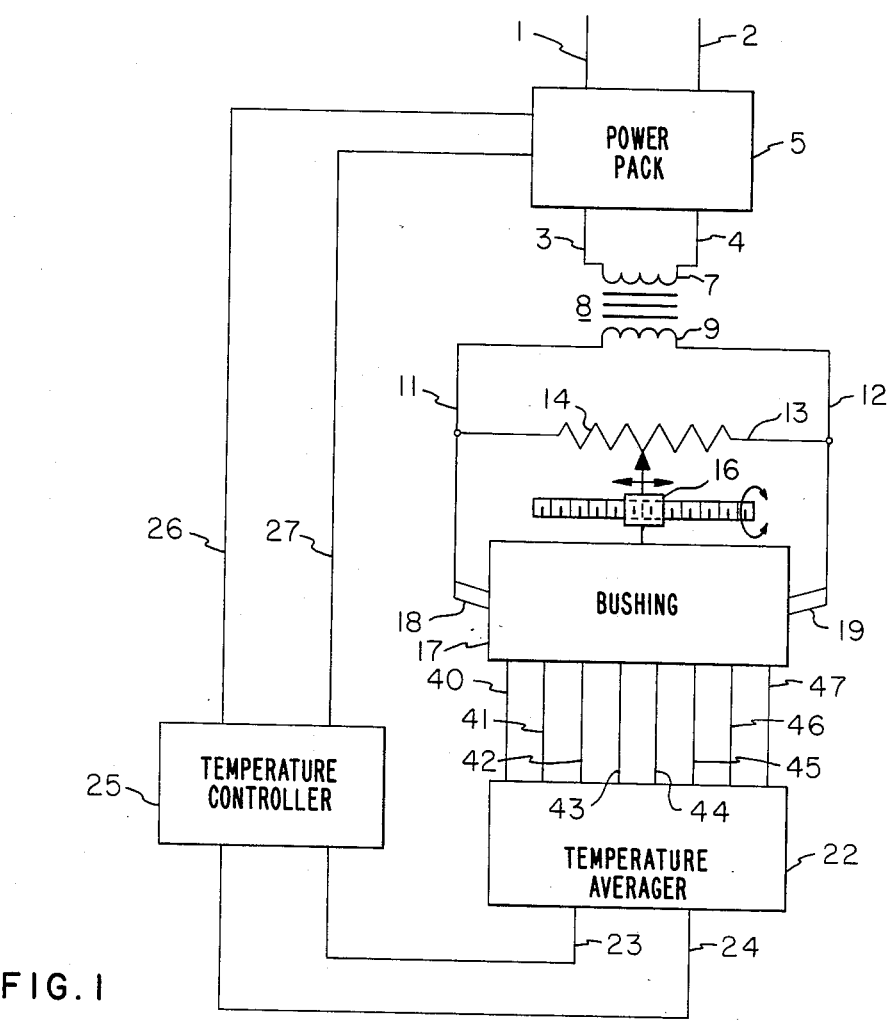
FIG. 1 is a diagrammatic flow sheet showing the apparatus of the instant invention and the relationships of each of the devices used to control the temperature of a fiber glass forming bushing.

Referring to FIG. 1, there is shown input power lines 1 and 2 feeding into a power pack 5 which has two electrical leads 3 and 4 which feed current into the primary coil 7 of a power transformer generally indicated at 8. Secondary coil 9 of the transformer 8 is connected across electrical lines 11 and 12. Connected in parallel with the secondary coil 9 of the transformer 8 is line 13 which has a variable imnpedance 14, a potentiometer as shown, associated therewith utilizing a wiper arm 16 connected to bushing 17. Lead lines 11 and 12 feed electrical connectors 18 and 19 which feed current to a fiber glass bushing 17.

Figure 2:
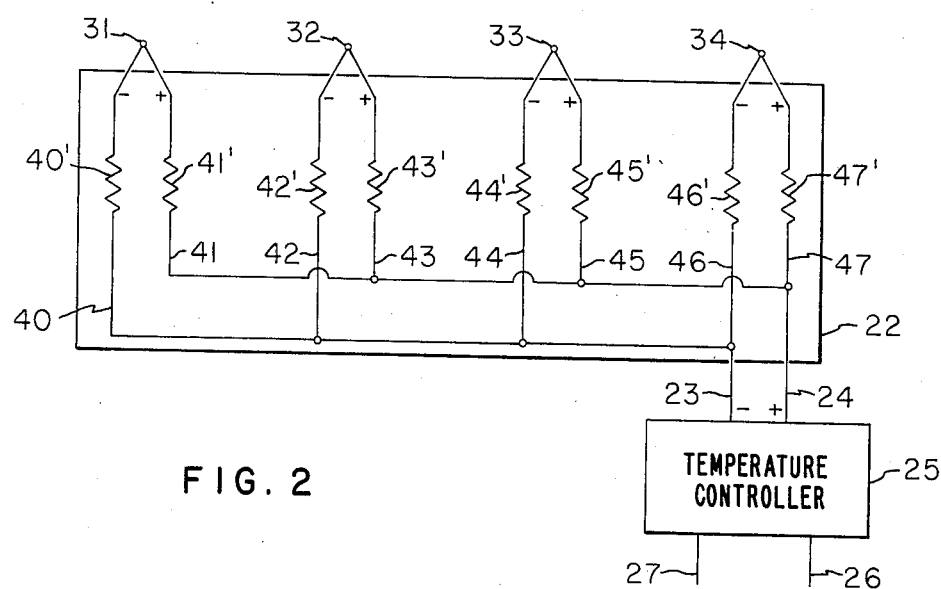
FIG. 2 is a line diagram of the temperature averaging device utilized to average temperatures measured at the bushing.
Figure 3:
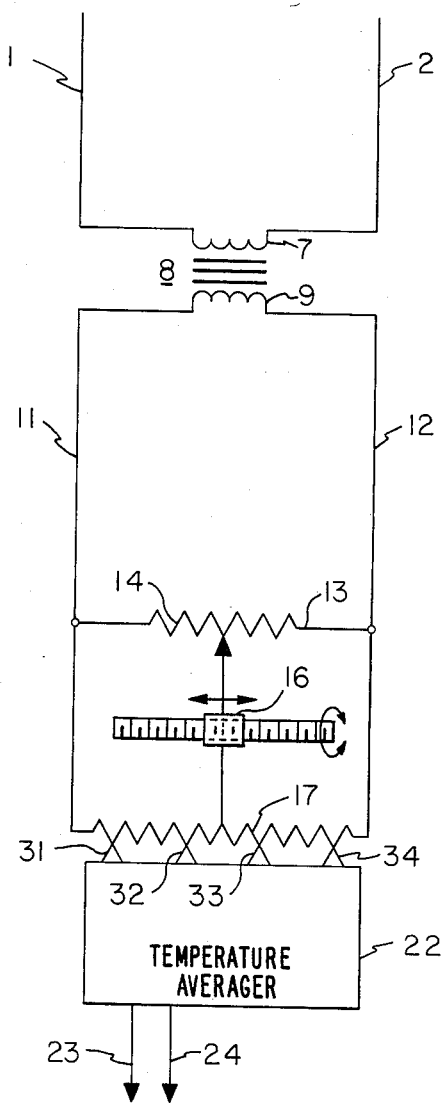
FIG 3 is a flow diagram showing the temperature averaging device, the rheostat and their relationship to the power transformer for the bushing.

Lines 40, 41, 42, 43, 44, 45, 46 and 47 shown leaving the bushing 17 feed signals from theromcouples associated with them in response to temperatures measurements made in the bushing 17 to a temperature averaging device 22 which is more fully described in FIG. 2. The average temperature sensed by the device 22 produces signals that are fed through lines 23 and 24 to a bushing temperature controller 25. The temperature controller 25 in response to the signal received from averaging device 22 produces signals which are sent to the power pack 5 through lines 26 and 27 and the power pack 5 by virtue of its operation adjusts current fed to the primary coil 7 of the transformer 8 in response to signals from the temperature controller 25 to thereby alter the current input to the bushing 17.

FIG. 2 as shown illustrates a temperature averaging device which utilizes four thermocouples 31, 32, 33 and 34. These thermocouples 31, 32, 33 and 34 are typically placed on the face plate of the bushing across its length, TABLE II-continued

| Package Wt. in Lbs. | |
| --- | --- |
| Front | Back |
| 22.15 | 22.35 |
| 22.10 | 22.15 |
| Avg. 22.12 | 22.15 |

TABLE III

| Package Wt. in Lbs. | |
| --- | --- |
| Front | Back |
| 22.30 lbs | 22.34 lbs |
| 22.45 | 22.40 |
| 22.40 | 22.40 |
| 22.25 | 22.20 |
| 22.35 | 22.25 |
| 22.40 | 22.40 |
| 22.25 | 22.20 |
| 22.30 | 22.25 |
| 22.15 | 22.05 |
| 22.20 | 22.00 |
| 22.20 | 22.20 |
| 22.05 | 22.05 |
| 22.10 | 22.20 |
| Avg. 22.26 | 22.23 |

As can be readily appreciated, the variation of weight from front to back was minimal in both sets of runs and the runs clearly demonstrate that the control device works effectively to limit yardage variation on front to back packages collected on a single winder from a single split bushing. The device is simple to operate and requires only the adjustment of a single dial controlling the wiper arm and consequently the resistance on each side of the shunt to accomplish the necessary result of equalizing package weights front to back on a winder collecting two or more packages from a single split bushing. Checks of the current can be made from time to time by the operators. The amount of adjustment required on the potentiometer, i.e. the impedance 14 and wiper 16 can be monitored by observing the current change to the center tap by using a clamp on ammeter or by marking the wiper arm 16 control with a suitable dial. While in the preferred embodiment of the invention a temperature averaging device of specific construction was used in conjunction with the potentiometer and shunt system used to control the bushing halves, the shunt and potentiometer alone can be effective. If used without a temperature averaging device the current adjustment to the bushing halves is first made to equalize them and then the temperature control of the whole bushing is adjusted to the desired temperature. Thus, for example, in a double bushing if one half of a bushing is operating at 2215° F. and the second half is operating at 2230° F. and the desired package weight is that produced by the high temperature half of the bushing the wiper arm 16 is moved to provide more resistence to the colder side of the bushing to produce a 15° change. The bushing controller is then further adjusted as required to maintain the total bushing temperature at 2230° F.

It will be obvious to the skilled artisan that other modifications can be made to the present invention without seriously departing from the basic concept. Thus, the number of thermocouple taps utilized to average temperatures from the bushing in the preferred embodiment can be increased over the four shown in the illustration of FIG. 2 or decreased without changing the basic concept of the invention. The measured bushing temperatures coupled with the utilization of a variable impedance element in the power feed lines to the bushing can be controlled by a potentiometer or other similar mechanism such as coils, capacitors and the like to shunt current from one side of the bushing to the other to achieve substantially uniform package weights, front to back for two strands made from a split bushing. This has no deleterious effect on fiber formation so long as the currents are balanced to produce substantially the same weights front to back on the winder since the fibers and the strands made from these fibers as they are gathered are all traveling at the same speed. The only difference, therefore, front to back on the winding collet, will be the weight of the glass. By virtue of the instant invention that weight is equalized.

While the invention has been described with respect to certain specific examples, it is not intended to be limited thereby except insofar as it appears in the accompanying claims.

We claim:

1. In the operation of a fiber glass bushing from which several strands are being produced and wound as multiple packages on a single winding collection surface, and wherein the package weights vary beyond a desired value, the improvement comprising, sensing the temperature of the bushing at one or more locations on the bushing, producing signals in response to the sensed temperature, feeding those signals to a control circuit for a power transformer supplying power to the bushing, providing a variable impedance across power input to the bushing and in contact with an adjustable tap connected to the bushing and varying the current supply to each side of the bushing by movement of the tap on the variable impedance to equalize the weight of the packages being wound to thereby bring them to the desired value.

2. In a fiber glass bushing having a power control circuit including a power transformer with its secondary coil connected across the bushing, a temperature controller connected to a power pack, the power pack being connected across the transformer primary coil the improvement comprising, a shunt connected across the bushing between the secondary coil of the transformer and the bushing, a variable impedance positioned in said shunt, a tap connected to the bushing and said variable impedance and means to move said tap to change the current input to each side of the bushing.

3. The bushing of claim 2 wherein the impedance is a variable resistor.

4. In a fiber glass bushing having a power control circuit including a power transformer having its secondary coil connected across the bushing, a temperature controller connected to a power pack, said power pack being connected across the transformer primary coil, the improvement comprising, means on said bushing to measure the temperature thereof and produce a signal in response to the measured temperature, means to feed the resulting signal to the temperature controller, a shunt connected across the bushing and the secondary coil of the transformer, a variable impedance positioned in said shunt and connected to the bushing through a tap connected to the bushing a means to move the tap to change the current input to each side of the bushing.

5. The bushing of claim 4 wherein the impedance is a variable resistor.

6. In a fiber glass bushing having a power control circuit including a power transformer having its secondary coil connected across the bushing, a temperature controller connected to a power pack connected across the transformer primary coil, the improvement comprising, means on said bushing to measure temperatures across the length of the bushing at several points, means to average the several temperatures so measured to produce a signal representing the averaged temperature, means to feed the signal to said temperature controller, a shunt connected across the bushing and the secondary coil of the transformer, a variable impedance positioned in said shunt and connected to said bushing through a tap connected to the bushing and means to move the tap to change the current input to each side of the bushing.

7. The bushing of claim 6 wherein the variable impedance is a variable resistor.

* * * * *